United States Patent [19]

Hagiwara

[11] 4,346,114

[45] Aug. 24, 1982

[54] SOY SAUCE FROM TEAR GRASS AND PROCESS FOR PRODUCTION THEREOF

[75] Inventor: Yoshihide Hagiwara, Takarazuka, Japan

[73] Assignee: Japan Natural Food Co. Ltd., Osaka, Japan

[21] Appl. No.: 237,871

[22] Filed: Feb. 25, 1981

Related U.S. Application Data

[63] Continuation of Ser. No. 109,638, Jan. 4, 1980, abandoned.

[30] Foreign Application Priority Data

Jan. 12, 1979 [JP] Japan .................................... 54/1227

[51] Int. Cl.$^3$ ............................................ A23L 1/238
[52] U.S. Cl. ....................................... 426/18; 426/46; 426/49; 426/52; 426/60; 426/589
[58] Field of Search ....................... 426/46, 49, 52, 50, 426/60, 48, 589, 18

[56] References Cited

U.S. PATENT DOCUMENTS

3,914,436 10/1975 Nakadai et al. ..................... 426/589
4,028,470 6/1977 Hayashi et al. ........................ 426/46
4,180,591 12/1979 Kazuo et al. ......................... 426/589

OTHER PUBLICATIONS

Chem. Abs. 87:165990g, Fermentation products from Yulmu (*Coix lachryma-jobi*); Son, Tae Yup, 1974.

*Primary Examiner*—Jeanette M. Hunter
*Attorney, Agent, or Firm*—Sherman & Shalloway

[57] ABSTRACT

A process for producing a tear grass soy sauce, which comprises inoculating a koji mold for soy sauce in a koji substrate comprising a denatured proteinous material and a denatured carbohydrate material, at least a part of said carbohydrate material being tear grass, cultivating the koji mold to form a koji for soy sauce, adding water and sodium chloride to the koji to prepare moromi, fermenting the moromi, and separating the liquid layer from the fermentation product; and a tear grass soy sauce obtained by aforesaid process.

8 Claims, No Drawings

SOY SAUCE FROM TEAR GRASS AND PROCESS FOR PRODUCTION THEREOF

This is a continuation of application Ser. No. 109,638, filed Jan. 4, 1980, now abandoned.

This invention relates to a soy sauce containing ingredients resulting from the fermentation of the useful ingredients of tear grass, which in organoleptic tests shows equivalent or superior flavor, taste, gloss and color to a soy sauce from conventional materials not containing tear grass, and which can be produced with excellent improved results in koji-making and fermentation; and to a process for production thereof.

Tear grass, or Job's tears, is a plant belonging to Genus Coix, Tribe Maydeae, Subfamily Panicoideae, Family Gramineae, and is typically named *Coix lachryma-jobi* Linne var. mayhen Stapf (Gramineae). Many varieties of it exist. In the present application, all of these are generically called "tear grass". Frequently, the seeds of the above plant are specifically called "tear grass", and the use of the seeds of tear grass is preferred in this invention.

The husked seeds of tear grass are called coicis semen. They exhibit pharmacological effects such as diuretic, anti-inflammatory, analgesic and pus-removing activities, and have been known from old as herb drugs useful for the treatment of edema, rheumatism, neuralgia, etc. For example, "Shinno Honzo Kyo", a classical Chinese treatise on herb medicines published in the 5th century, classifies coicis semen as a high-grade herb medicine effective for making the body light, for invigoration and for longevity. It has also been used from old as a nourishing and tonic folk medicine useful for the removal of warts or for the prevention and treatment of skin roughening.

No suggestion or attempt has been made in the past to produce a soy sauce from materials containing tear grass as a koji substrate and a method for its production. Attempts were previously made to use the husked seeds of tear grass as substitutes for cereals, or to process them into cakes or jams, by utilizing their carbohydrate, protein and fat contents. Attempts were also made to produce an alcoholic liquor using tear grass as a substitute for rice koji. It was also attempted to use tear grass as a material for a koji substrate for the making of miso paste. However, tear grass did not actually gain acceptance as a cereal substitute because it was difficult to obtain in large quantities and was expensive, and particularly, it was difficult to husk and grind and moreover had poor flavor and palatability. The use of tear grass as a material for miso production also did not come into commercial use because of various troubles. For example, tear grass has poor water absorption partly because the husked seeds of tear grass have a film on their surface. Consequently, it is difficult to make a miso koji from this material, and the solubility of the miso koji during the fermentation process of miso production is reduced. Moreover, dark brown filamentary materials present on the surface of the tear grass seeds in close contact therewith are large, and remain as black dirts in the resulting miso product and thus degrades its merchandise value. The flavor and palatability of the resulting miso are also unsatisfactory.

The present inventor endeavored to develop a method for effectively utilizing tear grass which has previously been used as a folk medicine for nourishment, tonic effect, and beauty treatment but has not gained commercial acceptance.

As a result, he found unexpectedly that tear grass which suffered from the various troubles in miso making is very suitable as a material for the making of soy sauce for which no attempt has been made to use tear grass in the past.

It was also found that in spite of the fact that husked seeds of tear grass, when roasted, are extremely hard, and the higher content of fat in tear grass than wheat, a conventional material for soy sauce production, and the lipid inherently contained in tear grass are expected to affect adversely the roasting denaturation of tear grass, no inconvenience which would be expected from the above-mentioned troubles in the production of miso occurs in soy sauce production. On the contrary, it was unexpectedly found that when tear grass is used as a material for the production of soy sauce instead of wheat, it shows excellent adaptability to koji making and fermentation to give a unique soy sauce product which contains the fermentation products of the useful components of tear grass and shows excellent flavor, taste, gloss and color in organoleptic tests.

It was further discovered that in the preparation of a soy sauce koji from tear grass, the growth of spores of a koji mold is markedly promoted to afford a typical high-grade soy sauce koji free from odors peculiar to the use of tear grass, and koji making from tear grass proceeds in good condition without any trouble.

It was found that there can be produced a high-quality tear grass soy sauce koji in which the enzyme potencies of α-amylase, s-amylase, acidic protease and alkaline protease are equal to or better than those in a soy sauce koji prepared from wheat.

It was further found that in the fermentation process for producing soy sauce using moromi which is a charge stock broth for the production of soy sauce prepared by mixing the resulting koji for tear grass soy sauce with moderate amounts of sodium chloride and water, the dissolved condition of the koji is good without troubles at the early stage and this dissolved state is maintained thereafter; that the growth of yeasts is facilitated and the fermentation is very vigorous; that the saccharification of tear grass starch is vigorous; that the degree of increase of acidity and the degree of the decrease of pH are normal and the buffer value is fairly small; and that fermentation is good with no trouble even in the case of a shorter-time higher-temperature method.

It was also found that at an elevated temperature within a short period of time, fermentation proceeds in good condition with a good alcoholic smell, and a larger amount of glutamic acid is formed than in the case of using a wheat koji; and therefore that there can be obtained a unique soy sauce which contains the useful components of tear grass, shows excellent flavor, taste, gloss and color in organoleptic tests, and which specifically, has a good flavor free from an acidic smell, a charring smell, a mold smell and other offensive odors, tastes very well, has good sodium chloride affinity, is harmonous, and presents a deep and brilliant gloss and a clear color.

The inventor also discovered that the aforesaid improvements and effects can be further enhanced if the aforesaid soy sauce making process is performed by using an extract resulting from the extraction of a marine alga ash with an aqueous extractant by the methods disclosed, for example, in Japanese Laid-Open Patent Publications Nos. 87046/73, 121562/76, and 121563/76 in place of a part or the whole of sodium chloride used in moromi preparation. Furthermore, the inventor found that by using this embodiment, there can be provided a tear grass soy sauce desirable for health and nourishment which contains useful minerals derived from the marine alga ash in a well-balanced state and the useful components of tear grass, and has a reduced content of sodium chloride.

It is an object of this invention therefore to provide a unique tear grass soy sauce having the aforesaid advantages, and a process for its production.

The above and other objects and advantages of this invention will become more apparent from the following description.

The tear grass used in this invention includes its seeds, husked seeds thereof, and ground or powderized products thereof. Husked seeds and the ground products thereof are especially preferred.

According to this invention, there is provided a process for producing a tear grass soy sauce, which comprises inoculating a koji mold for soy sauce in a koji substrate comprising a denatured proteinous material and a denatured carbohydrate material, at least a part of said carbohydrate material being tear grass, cultivating the koji mold to form a koji for soy sauce, adding water and sodium chloride to the koji to prepare moromi, fermenting the moromi, and separating the liquid layer from the fermentation product.

Methods for producing soy sauces are well known, and these known techniques can be used in this invention except that tear grass is used as a part of the raw materials.

Examples of the proteinous materials include soybean, defatted soybean, and soybean-containing materials containing at least one of gluten, fishmeal, peanut and defatted peanut. Examples of the carbohydrate materials are tear grass, wheat, corn, rice, soy sauce lees and wheat husk.

In many cases, naturally occurring proteinous materials and carbohydrate materials are used after denaturation as is the case with the prior art. If desired, however, the carbohydrate material may be used without denaturation. Preferably, the denaturation of the proteinous materials and carbohydrate materials is carried out by heat treatment procedures such as steaming or roasting. The temperature for the heat treatment is, for example, about 80° C. to about 200° C.

A koji mold for soy sauce is inoculated in a koji substrate for soy sauce comprising a denatured proteinous material and a denatured carbohydrate material, at least a part of the carbohydrate material being tear grass, and cultivated therein to form a koji for soy sauce.

The amount of the tear grass used can be selected as required. For example, it is at least 10% by weight, preferably at least about 50% by weight, more preferably at least 70% by weight, based on the weight of the carbohydrate material.

The cultivation conditions are selected depending upon the koji mold used, and temperatures and pH values appropriate to the growth of the koji mold are suitable. For example, at the initiation of cultivation, the pH of the culture medium is about 4 to about 8.0, and the temperature is from room temperature to about 40° C., preferably about 37°±2° C. The time of cultivation can also be selected suitably, and for example, a period of about 40 to about 100 hours may be employed.

According to the process of this invention, the koji obtained in the above manner is mixed with water and sodium chloride to form a charge stock which is called "moromi" in the art, and the resulting moromi is then fermented.

The fermentation can be performed while adjusting the pH at the start to about 4 to 7 and the temperature at the start to room temperature to about 40° C., for example. Preferably, the pH of the charge stock containing sodium chloride and water which is used at the start of fermentation is adjusted to about 6 to about 8.

In the process of this invention, a part or all of sodium chloride conventionally used in the production of soy sauce may be replaced by an extract obtained by extracting a marine alga ash with an aqueous extractant. In other words, the extract is common salt containing seaweed minerals. Usually, the extract is added during the preparation of moromi. If desired, it may be added before or after the preparation of moromi.

The amount of the marine alga ash extract can be changed as desired. Preferably, about 5 to about 95% by weight of sodium chloride customarily used in the production of soy sauces may be replaced by the marine alga ash extract. The amount of the seaweed ash extract is more preferably about 10 to about 85% by weight, more preferably about 15 to about 80% by weight, based on the weight of sodium chloride. By fermenting the moromi obtained by using the marine alga ash extract as a part or the whole of sodium chloride, there can be provided a "low sodium" soy sauce which contains less than about 50% of sodium chloride based on the amount of sodium chloride normally contained in soy sauce. Despite fermentation at low sodium chloride concentrations, the resulting soy sauce shows good flavor and palatability without any undesirable phenomenon such as spoilage, and fermentation can be performed to completion within a very much shortened period of time. The soy sauce having a low sodium chloride content can be obtained without any additional step or a blending step.

A suitable extract of marine alga ash is the one obtained by extracting a marine alga ash with an aqueous extracting agent selected from water and aqueous acid solutions.

Examples of such an extract of marine alga ash are extracts obtained by extracting ashes of red algae (Rhodophyta) belonging to Order Gigartinales, Class Florideae with aqueous extracting agents such as water or acid aqueous solutions, or the dried products of the extracts, as disclosed in Japanese Laid-Open Patent Publication No. 121568/76; extracts obtained by extracting ashes of edible marine alga such as green alga (Chlorophyta), brown alga (Phaeophyta) and other red alga than those mentioned above with acidic aqueous solutions, or the dried products of the extracts, as disclosed in Japanese Laid-Open Patent Publication No. 121562/76; extracts obtained by extracting ashes of edible marine algae such as green algae, brown algae and red algae with water, and the dried products of the extracts; and extracts or the dried products thereof obtained by extracting ashes of marine algae, to obtain an alkaline extract, extracting the water-insoluble residue obtained during the aforesaid water extraction, with water under acidic conditions with a pH of not more than 5 to form an acidic aqueous extract, optionally adjusting the pH of one or both of the alkaline extract and the acidic extract, and combining these extracts, and optionally drying the mixture, as disclosed in Japanese Laid-Open Patent Publication No. 87046/73.

The algal ashes obtained in the production of the aforesaid extracts can be obtained by heating algae to ashes under aeration, under restricted aeration, or under no aeration. The heating can be carried out at a temperature such that the organic matter in the algae does not remain in substantial amounts in the resulting ash. It is, for example, at least about 200° C., preferably at least about 450° C., for example, up to about 1000° C., preferably up to about 800° C. The extracting temperature can be selected as desired. Room temperature can be used, but if desired, elevated temperatures of up to about 100° C., and under elevated pressures, temperatures above about 100° C. can be employed. Examples of the acids used for extraction include inorganic acids such as hydrochloric acid, sulfuric acid, nitric acid, polyphosphoric acid and phosphoric acid, and organic acids such as acetic acid, lactic acid, tartaric acid, uric acid, succinic acid, malic acid, and naturally fermented vinegar.

Known koji molds can be used as the koji mold for soy sauce used in this invention. Examples include *Aspergillus oryzae* (ATCC 11866, ATCC 14895, ATCC 20386, AHU 7135, AHU 7136, AHU 7137, etc.), *Aspergillus usami* (ATCC 14331), *Aspergillus swamori* (ATCC 14333), *Aspergillus awamori* (ATCC 14335), *Aspergillus sojae* (AHU 7181) and *Aspergillus tamari* (AHU 7179).

These koji molds for soy sauce can also be obtained from the market in the form of seed kojis.

According to this invention, the tear grass soy sauce can be provided in any sodium chloride concentration from a high to a low one and also with substantially no sodium chloride. The resulting soy sauce can be used singly, or as a blend with soy sauce prepared from conventional materials.

The following Examples illustrate the tear grass soy sauce koji, moromi and soy sauce.

EXAMPLE 1

Hot water (40 liters) was uniformly sprinkled over 30 kg of defatted soybeans, and they were well mixed. The mixture was accumulated in the form of a hill for about 1 hour to cause complete water absorption. Then, the mixture was steamed for 50 minutes under a pressure of 12 pounds, and immediately withdrawn without standing in the steaming kettle. The steamed mixture was divided into two portions. One portion was intended for making a conventional soy sauce, and the other, for the production of the tear grass soy sauce in accordance with this invention.

Run No. 1: Preparation of a soy sauce koji for the conventional soy sauce

Wheat (15 kg) was roasted in a direct-burning type roasting kettle, crushed, and mixed well with one portion of the steamed defatted soybeans. Then, 25 g of a "Higuchi" seed koji for soy sauce (a pure culture of *Aspergillus oryzae* (AHU 7137) was sprayed onto the mixture. They were well stirred, and placed on a koji tray, and subjected to koji making in a customary manner in a koji-making chamber.

Run No. 2: Preparation of tear grass soy sauce koji by the method of this invention Husked tear grass seeds (15 kg) were roasted in a direct-burning type roasting kettle carefully so that the seeds became light brown and were puffed. The puffed seeds of tear grass were crushed, and well mixed with the other portion of the steamed defatted soybeans. Then, 25 g of a "Higuchi" seed koji mold for soy sauce (a pure culture of *Aspergillus oryzae* AHU 7137), and they were well stirred. The mixture was placed on a koji tray, and subjected to koji making in a customary manner in a koji-making chamber in the same way as in Run No. 1.

State of proceeding of koji making

Both in Runs Nos. 1 and 2, care was taken so that the temperature of the koji-making materials did not exceed 40° C. Smells during koji making were considerably high, but in Run No. 2, no unusual smell ascribable to the use of tear grass was noted. Other offensive odors such as an ammoniac smell were not given off. No stickiness was noted, either. In short, the koji making proceeded in good condition without any trouble.

The resulting kojis were recovered on the fourth day. The kojis obtained were typical high-grade kojis with short hyphae but marked growth of spores as were characteristic of seed kojis for soy sauce. The mold grew moderately and very uniformly. They had good flavors, and were apparently well-made kojis of good quality. The amount of the koji recovered in each Run was 30.2 kg on an average, and the koji contained 25.0% of water on an average (the values were determined immediately after recovery of koji).

Measurement of the enzyme potency of the resulting koji

The enzyme potencies of the tear grass soy sauce koji obtained in Run No. 2 were measured, and compared with those of soy sauce koji obtained from wheat in a customary manner in Run No. 1. The enzymes measured were α-amylase, s-amylase, acidi protease, and alkaline protease. It was found that the enzyme potencies were almost the same for the two kojis.

Preparation of a soy sauce moromi and soy sauce

Sodium chloride (13.0 kg) was dissolved in 48.0 liters of tap water to obtain 51.1 liters of a sodium chloride aqueous solution having a Baumé of 19.5° and a pH of 6.0. Two such salt solutions were provided, and the resulting koji was put in each of them. They were mixed well to form moromi.

On the third day after moromi production, all moromis were placed in a chamber maintained at 28° to 29° C., and subsequently fermented for about 2 months until the temperature of the outer atmosphere became about 25° C. with occasional stirring.

The state of fermentation and the manner of dissolving of koji in the two kojis during fermentation and thereafter were observed. It appeared from the results of observation that the tear grass soy sauce moromi in Run No. 2 was slightly softer than the ordinary soy sauce moromi obtained in Run No. 1 from wheat. In both of them, the state of dissolving of the koji was fairly good from the start. The tear grass moromi in Run No. 2 relatively rapidly softened, and its fermentation began in about 2 weeks after the charged stock preparation. The fermentation thereafter was very active, and the manner of dissolving of the koji was in good condition. The state of fermentation and the manner of dissolving of koji were better than in the case of ordinary moromi obtained from wheat in Run No. 1. After 30 days from the charge stock preparation, both moromis showed a tendency toward vigorous fermentation, and every time they were stirred, a good alcoholic smell was strongly given off. After 2 months, the dissolving of the koji was very good, and no offensive odor was noted. Thus, the condition of moromi was very good, and its gloss and color gradually became thicker. The moromi liquids were periodically analyzed, and the results are shown in Tables 1 and 1'.

Results of organoleptic tests

The control soy sauce and the tear grass soy sauce of this invention both had a very good flavor despite the fact that both were obtained by fermentation at relatively high temperatures. A fermentative smell was given off considerably, and in particular, the tear grass soy sauce gave off a fairly strong alcoholic smell and was free from offensive odors (such as sour, charring and mold smells). The taste of the soy sauce of the invention was better than the control soy sauce. The salt was well-balanced in the other components in the soy sauce. This was because the content of glutamic acid in the soy sauce of this invention was higher than that of the soy sauce obtained in Run No. 1. In view of the general common knowledge of the production of soy sauce, it was surprising that the amount of glutamic acid reached nearly 0.8 g per gram of nitrogen in fermentation using the shorter-term higher-temperature method. The koji prepared by using tear grass in place of wheat had the same enzyme potencies as that of the koji prepared by using wheat. The decomposition and dissolving of the moromi were very good, and the useful components of tear grass were dissolved in the moromi. The fermentation of the moromi was very active, and the final product of fermentation was rather more tasty than that from wheat.

TABLE 1

| Time elapsed (days) | Baumé degree (°) | Total nitrogen (%) | Amino nitrogen (%) | Sodium chloride (%) | Total sugar (%) | Direct sugar (%) | Acidity I | Acidity II | pH | Buffer value | Alcohol (%) | Color value (*) |
|---|---|---|---|---|---|---|---|---|---|---|---|---|
| (Control moromi in Run No. 1) | | | | | | | | | | | | |
| 35 | 24.00 | 1.56 | 0.71 | 18.40 | 7.55 | 7.08 | 8.45 | 9.25 | 5.20 | 1.25 | 0.88 | 20 |
| 72 | 23.05 | 1.64 | 0.81 | 19.07 | 6.14 | 5.55 | 10.60 | 11.15 | 5.05 | 1.05 | 1.87 | 17 |
| 104 | 23.20 | 1.70 | 0.86 | 19.67 | 4.34 | 4.12 | 11.20 | 12.80 | 4.90 | 0.90 | 2.45 | 14 |
| (Tear grass moromi of the invention in Run No. 2) | | | | | | | | | | | | |
| 35 | 23.95 | 1.58 | 0.71 | 18.30 | 7.05 | 6.37 | 8.60 | 9.60 | 5.10 | 1.15 | 0.80 | 20 |
| 70 | 23.10 | 1.71 | 0.85 | 19.05 | 5.87 | 5.66 | 11.25 | 12.00 | 4.90 | 0.95 | 1.95 | 15 |
| 110 | 23.25 | 1.79 | 0.88 | 19.46 | 4.13 | 3.88 | 13.05 | 13.15 | 4.80 | 0.70 | 2.64 | 12 |

(*) The color value was measured by a standard color meter for soy sauce.

It is seen from the above tables that the total nitrogen and amino nitrogen contents were much the same for both moromis, but the saccharified condition of the tear grass moromi was better than that of the moromi from wheat.

After a lapse of 120 days from the charge stock preparation, the moromi was squeezed to obtain about 51.4 liters of crude soy sauce in each case. Each crude soy sauce was heat-sterilized, and 0.005% of butyl p-hydroxybenzoate as an antimold agent was uniformedly dissolved in it. Filtration afforded 51.2 liters of clear soy sauce in each case. The products were analyzed, and the results are shown in Table 2.

TABLE 2

| Soy sauce | Baumé degree | Total N (%) | Amino N (%) | Sodium chloride | Total sugar (%) | Direct sugar (%) |
|---|---|---|---|---|---|---|
| No. 1 (control) | 23.30 | 1.68 | 0.90 | 19.76 | 4.14 | 4.06 |
| No. 2 (tear grass soy sauce) | 23.20 | 1.74 | 0.89 | 19.66 | 3.90 | 3.61 |

| Soy Sauce | Acidity I | Acidity II | pH | Buffer value | Alcohol (%) | Color value | Dilution turbidity (**) |
|---|---|---|---|---|---|---|---|
| No. 1 (control) | 11.60 | 12.80 | 4.85 | 0.85 | 2.06 | 12 | (−) |
| No. 2 (tear grass soy sauce) | 13.15 | 13.20 | 4.75 | 0.65 | 2.02 | 10 | (−) |

(**) After boiling the soy sauce, the supernatant liquid was taken and diluted with 6 to 8 times its volume of water. When turbidity formed, the dilution turbidity was rated "+", and when no turbidity formed, the dilution turbidity was rated "−".

The amount of free glutamic acid in the products was as shown in Table 3.

TABLE 3

| Soy sauce | Glutamic acid (mg/ml) | Total nitrogen (%) | Amount of glutamic acid (g per 1.0g of T.N) |
|---|---|---|---|
| No. 1 (control) | 12.08 | 1.68 | 0.70 |
| No. 2 (tear grass soy sauce) | 12.96 | 1.74 | 0.75 |

EXAMPLE 2

A tear grass koji for soy sauce was prepared in the same way as in Example 1 using 15 kg of defatted soybeans and 15 kg of husked seeds of tear grass.

Separately, 2.6 kg of a dried powder of the water extract of a marine alga ash obtained by extracting the ash of a marine alga with water and 10.4 kg of sodium chloride were dissolved in 48.0 liters of tap water to produce 51.1 liters of a charge stock having a Baumé degree of 19.5°. The resulting koji was put into the charge stock, and fermented at relatively low temperatures under the same conditions as in Example 1. The moromi softened more rapidly, and on about the 10th day after the start of fermenting operation, the moromi began to be fermented. With the start of fermentation, the moromi softened to a greater extent, and on the 20th day after the charge stock preparation, the moromi was in the state of vigorous fermentation. This state subsided on about the 70th day, and thereafter, the fermentation proceeded gently. Every time the moromi was stirred, it gave off a good alcoholic smell.

The moromi was periodically analyzed, and the results are shown in Table 4.

TABLE 4

| Time elapsed (days) | Baumé degree (°) | Total N (%) | Amino N (%) | Sodium chloride (%) | Total sugar (%) | Direct sugar (%) | Acidity I | Acidity II | pH | Buffer value | Alcohol (%) | Color value |
|---|---|---|---|---|---|---|---|---|---|---|---|---|
| 35 | 23.90 | 1.60 | 0.73 | 16.11 | 7.66 | 7.07 | 9.00 | 9.95 | 5.10 | 1.15 | 1.14 | 20 |
| 70 | 23.40 | 1.73 | 0.86 | 16.82 | 5.19 | 4.68 | 12.45 | 12.25 | 4.85 | 0.90 | 2.55 | 16 |
| 110 | 23.15 | 1.80 | 0.90 | 17.07 | 3.77 | 3.31 | 13.60 | 13.40 | 4.75 | 0.65 | 2.80 | 14 |

It is seen from the above table that the total nitrogen or amino nitrogen were formed somewhat earlier than in the tear grass moromi of Example 1, Run No. 2, but there was no significant difference. The saccharified condition of the tear grass starch was very good, and both total sugar and direct sugar were dissolved in good condition. Because of the vigorous fermentation, the degree of disappearance of sugars was very remarkable, and with it, the formation of alcohol was slightly more rapid and the amount of alcohol was larger. On the 120th day after the charge stock preparation, the moromi was squeezed and worked up by the same operation as in Example 1 to afford 51.0 liters of tear grass soy sauce with a reduced sodium chloride content. The soy sauce was analyzed, and the results are shown in Table 5.

TABLE 5

| | |
|---|---|
| Baumé degree | 23.05 |
| Total nitrogen (%) | 1.78 |
| Amino nitrogen (%) | 0.93 |
| Sodium chloride (%) | 14.8 |
| Total sugar (%) | 3.66 |
| Direct sugar | 3.20 |
| Acidity I | 13.70 |
| Acidity II | 13.45 |
| pH | 4.70 |
| Buffer value | 0.60 |
| Alcohol (%) | 2.16 |
| Color value | 12 |
| Dilution turbidity | (−) |

The glutamic acid content of the soy sauce was as shown in Table 6.

TABLE 6

| Glutamic acid (mg/ml) | Total nitrogen (%) | Glutamic acid (g per 1.0g of T.N.) |
|---|---|---|
| 13.48 | 1.78 | 0.76 |

Results of organoleptic tests

The flavor of the resulting soy sauce was much the same as that of the tear grass soy sauce produced in Run. No. 2 of Example 1, and was very good. It gave off a fragrant smell of fermentation with no offensive odor. It tasted very good with good salt affinity. It was moderately sour. There was no defect in taste, and the soy sauce had a deep brilliant gloss and a clear color. The glutamic acid content was large, and the taste of the soy sauce was especially good.

What is claimed is:

1. A process for producing a tear grass soy sauce, which comprises inoculating a koji mold for soy sauce in a koji substrate comprising a denatured proteinous material and a denatured carbohydrate material, at least 10% by weight based on the weight of said carbohydrate material being tear grass, cultivating the koji mold to form a koji for soy sauce, said cultivation being started at a pH of about 4.0 to about 8.0 and a temperature of from room temperature to about 40° C. adding water and sodium chloride to the koji to prepare moromi, fermenting the moromi, said fermentation being started at a pH of about 3 to about 7 and a temperature of from room temperature to about 40° C. and separating the liquid layer from the fermentation product.

2. The process of claim 1 wherein about 5 to about 95% by weight of sodium chloride is replaced by marine alga ash extract obtained by extracting the ash of an edible marine alga selected from the group consisting of green alga, brown alga, and red alga with an aqueous extracting agent.

3. The process of claim 1 wherein said proteinous material is soybean, defatted soybean, or a soybean-containing material containing at least one of peanut, defatted peanut, gluten and fishmeal.

4. The process of claim 1 wherein said carbohydrate material is at least one material selected from wheat, corn, rice, soy sauce lees and wheat husk.

5. The process of claim 1 wherein said denatured proteinous and carbohydrate materials are obtained by heat-treating proteinous and carbohydrate materials.

6. The process of claim 1 wherein at least 50% by weight of said carbohydrate material is tear grass.

7. The process of claim 6 wherein at least 70% by weight of said carbohydrate material is tear grass.

8. A tear grass soy sauce obtained by the process of claim 1, 2, 3, 4, 5, 6 or 7.

* * * * *